United States Patent
Wilkey et al.

[11] Patent Number: 6,153,727
[45] Date of Patent: Nov. 28, 2000

[54] EXTRACTION OF METAL RESIDUES FROM POLYMER CEMENTS

[75] Inventors: John David Wilkey, Houston; Zaida Diaz, Brookshire, both of Tex.

[73] Assignee: Shell Oil Company, Houston, Tex.

[21] Appl. No.: 09/135,725

[22] Filed: Aug. 18, 1998

[51] Int. Cl.$^7$ ................................................. C08F 6/00
[52] U.S. Cl. ............................................................. 528/486
[58] Field of Search ............................................. 528/486

[56] References Cited

U.S. PATENT DOCUMENTS

| | | | |
|---|---|---|---|
| 3,308,105 | 3/1967 | Hoyt et al. | 260/88.2 |
| 3,402,042 | 9/1968 | Lichty | 75/119 |
| 3,415,800 | 12/1968 | Kutner | 260/93.7 |
| 4,028,485 | 6/1977 | Poloso et al. | 528/486 |
| 4,162,296 | 7/1979 | Muller et al. | 423/139 |
| 4,210,625 | 7/1980 | Flett | 423/139 |
| 4,396,761 | 8/1983 | Willis | 528/487 |
| 4,482,705 | 11/1984 | Hambrecht | 528/486 |
| 4,567,251 | 1/1986 | Balas | 528/487 |
| 4,992,529 | 2/1991 | Hoxmeier | 528/486 |
| 5,017,685 | 5/1991 | Brugel | 528/480 |
| 5,073,621 | 12/1991 | Tsiang | 528/483 |
| 5,281,696 | 1/1994 | Gibler | 528/485 |
| 5,543,472 | 8/1996 | Stevens | 525/387 |
| 5,545,712 | 8/1996 | Tsutsui | 528/408 |

FOREIGN PATENT DOCUMENTS

| | | | |
|---|---|---|---|
| 842 351 | 12/1966 | Canada . | |
| 0 316 982 A2 | 5/1989 | European Pat. Off. | C08F 6/08 |
| 0 186 918 B1 | 5/1991 | European Pat. Off. | C08F 6/08 |
| 1021571 | 11/1955 | Germany . | |
| 2 295 154 | 5/1996 | United Kingdom | C08F 6/08 |

*Primary Examiner*—Paul R. Michl
*Attorney, Agent, or Firm*—Beverlee G. Steinberg

[57] ABSTRACT

There is provided a method of removing metal residues from a polymer cement, the method comprising polymerizing a monomer with a metal-based polymerization initiator to give a polymer cement having metal polymerization initiator residue; adding an organic-soluble acid having a pKa no greater than about 4.5 to the polymer cement, thereby forming an acid containing organic phase; mixing the organic phase with an aqueous phase containing a mineral acid; and recovering the polymer cement substantially free of metal residue.

23 Claims, 1 Drawing Sheet

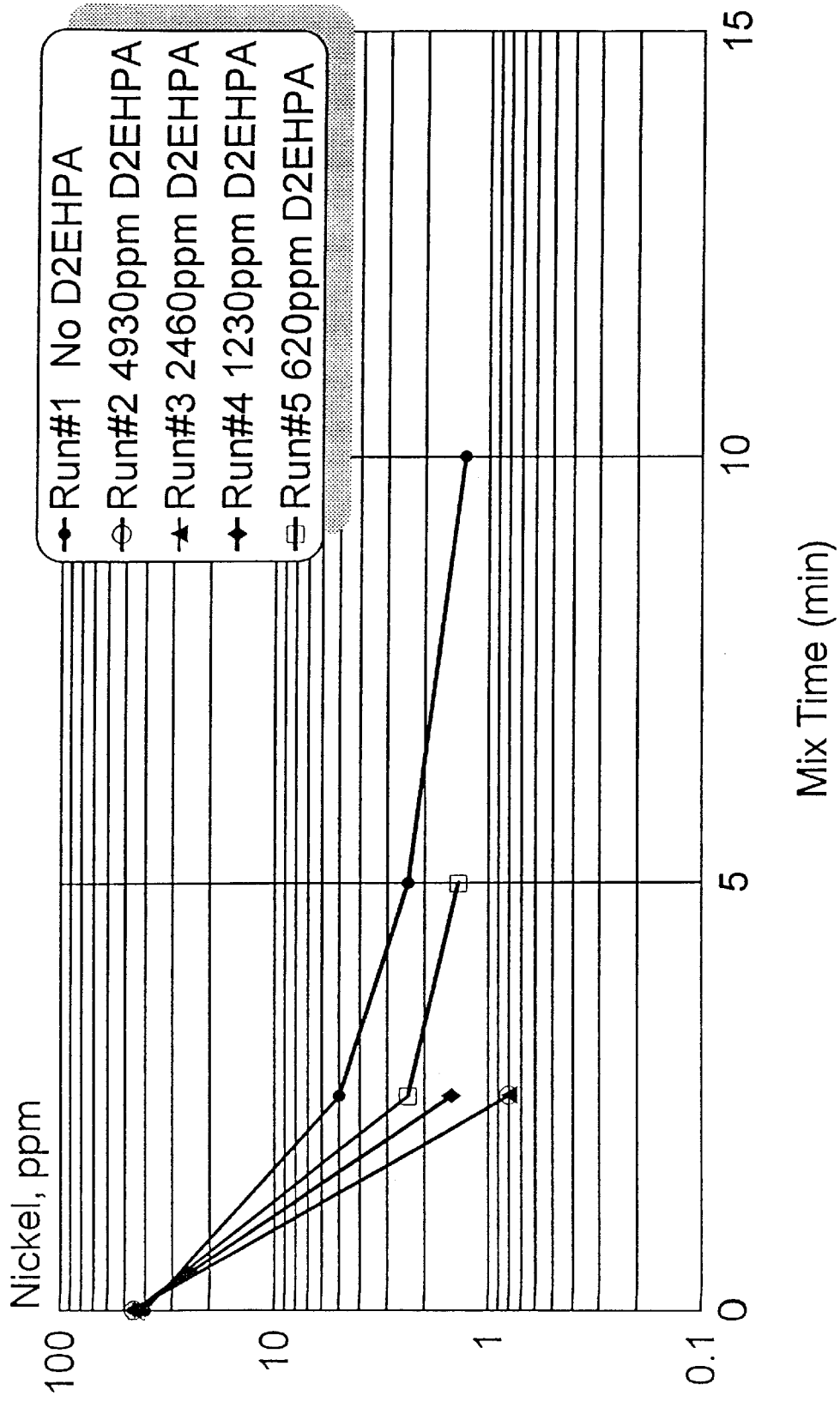
Figure 1: Effect of D2EHPA on extraction kinetics

EXTRACTION OF METAL RESIDUES FROM POLYMER CEMENTS

FIELD OF THE INVENTION

This invention pertains to extraction of metal residues, in particular the extraction of metal initiation and/or hydrogenation catalyst residues from polymer cements.

BACKGROUND OF THE INVENTION

Extraction methods for removing metal residuals from polymer cements have been known in the art. An undesirable residue found in polymer cements is the residue of hydrogenation catalyst, particularly nickel-based hydrogenation catalyst. Commercial considerations require residual nickel levels of no more than about 25 parts per million on a polymer basis. Typical extraction methods, such as mixing an aqueous solution of mineral acid and oxygen with a polymer cement, require long contact times and large, expensive equipment to reduce the nickel to marketable levels. It is therefore desirable to have a rapid extraction method which will reduce the level of residual metals in polymer cement within short contact times.

SUMMARY OF THE INVENTION

It is an object of the invention to provide a rapid extraction method which will reduce the level of residual metals in polymer cement within short contact times.

It is further an object of the invention to provide a rapid extraction method that utilizes known techniques of aqueous acid extraction.

It has surprisingly been found that the rate of extraction of metal residues from a polymer cement can be significantly accelerated by the addition of small quantities of certain additives to the cement prior to an acid extraction step. There is provided a process for extracting metal-based residues from a polymer cement comprising adding organic soluble acids with pKa no greater than 4.5 to the polymer cement, mixing, and recovering a substantially metal residue free polymer cement.

According, there is provided a method of removing metal residues from a polymer cement, said method comprising: polymerizing a monomer with a metal-based polymerization initiator to give a polymer cement having metal polymerization initiator residue; adding an organic-soluble acid having a pKa no greater than about 4.5 to the polymer cement, thereby forming an acid containing organic phase; mixing the organic phase with an aqueous phase containing a mineral acid; and recovering the polymer cement substantially free of metal residue.

DESCRIPTION OF THE DRAWINGS

FIG. 1 shows the effect of di-2-ethylhexyl phosphoric acid on the extraction kinetics of a polybutadiene block co-polymer cement.

DETAILED DESCRIPTION OF THE INVENTION

It has surprising been found that the removal of metal residues from a polymer cement may be significantly accelerated by the inclusion of various additives to the cement prior to the extraction step. The additives are broadly categorized as organic-soluble acids which have a pKa which is no greater than 4.5.

The polymer cement is made by polymerizing a monomer with a metal-based polymerization initiator. A metal polymerization initiator residue remains in the polymer cement, and this is what must be removed to meet commercial standards.

Conventional means of residual metal removal involves extraction by contacting the polymer cement with an aqueous phase containing mineral acid, such as phosphoric or sulfuric acid. The cement/acid mixture is vigorously agitated for a time, typically from several minutes to several hours, sufficient to achieve a predetermined metal residue level. Thus, the extraction process is responsible for a significant fraction of the capital deployed in a commercial manufacturing unit. By adding an organic-soluble acid to the polymer cement, thereby forming an acid containing organic phase before contacting the polymer cement with the aqueous phase, a polymer cement substantially free of metal residue may be recovered in a fraction of the contact time.

Preferred organic-soluble acids are di-2-ethylhexyl phosphoric acid, 2-ethyl hexyl acid phosphate, butyl acid phosphate, 2-ethylhexylphosphonic acid mono(2-ethylhexyl) ester, dodecylbenzenesulfonic acid, nitrilotris (methylene) triphosphonic acid, and mixtures thereof. The most preferred organic-soluble acid is di-2-ethylhexyl phosphoric acid. As little as 600 ppm of the organic acid is added to the polymer cement to be effective in reducing extraction time to a predetermined nickel residue level by about 50 to about 75 percent compared to extraction with a mineral acid alone. The organic-soluble acid is also effective in reducing the concentration of mineral acid necessary for the extraction by up to 90 percent compared to the concentration of mineral acid for extraction with a mineral acid alone.

Satisfactory extraction is obtained at an aqueous phase to organic phase volume ratio as low as 0.1. For conventional extractions by mineral acids alone, mass transfer considerations dictate that the aqueous acid should be the continuous phase, necessitating an aqueous phase to organic phase volume ratio at least 0.30. Therefore, not only can a lower concentration of mineral acid be used with the addition of an organic-soluble acid, but a lessor overall amount of aqueous phase may be used.

The method will also remove metal residue from hydrogenation catalyst and the polymer cement may be hydrogenated with a metal based hydrogenation catalyst prior to addition of the organic-soluble acid.

Although the extraction method will work well on any organic polymer cement, by example herein an elastomeric block copolymer is described. Elastomeric block copolymer suitable for use are known in the art, as disclosed for instance in Stevens et al. U.S. Pat. No. 5,194,530 (Mar. 16, 1993). The copolymers are made by polymerizing monomers selected from the group conjugated alkadienes, monoalkenyl-substituted aromatic compounds and mixtures thereof The elastomeric block copolymers have at least two resinous endblocks of polymerized monovinyl aromatic compound, thus giving a resinous segment, and an elastomeric midblock of polymerized conjugated diene, thus giving an elastomeric segment. The copolymers can be linear, A-B-A, or radial. It is also possible to use a mixture of block copolymers, such as a combination of a high molecular weight copolymer and a medium molecular weight copolymer. Suitable monovinyl aromatic compounds are those having 8 to 20 carbon atoms as exemplified by styrene and styrene homologs such as alpha-methylstyrene and para-methylstyrene. Styrene is especially preferred. Suitable conjugated dienes include those having 4 to 8 carbon atoms. Illustrative of such conjugated dienes are 1,3-butadiene (butadiene), 2-methyl-1,3-butadiene (isoprene), 1-3- pentadiene (piperylene), 1,3-octadiene, and 2-methyl-1,3-pentadiene. Preferred conjugated dienes are butadiene and isoprene, most preferably butadiene.

Polymerization of conjugated diene hydrocarbons is done anionically with lithium initiators and is well known as described in U.S. Pat. Nos. 4,039,503 and Re. 27,145. Consequently, the metal residues from the polymerization are lithium. Alternatively, anionic polymerization of conjugated dienes may be performed using protected functional initiators (PFI) as described in U.S. Pat. Nos. 5,391,663 and 5,146,168.

When the conjugated diene used is butadiene, the copolymers may be hydrogenated to such a degree that the unsaturation of the elastomeric block is greatly reduced without significant change in unsaturation of the resinous block component. This is achieved with nickel catalysts as described in U.S. Pat. Nos. Re. 27,145 and 4,970,254. The residues of the hydrogenation catalyst are nickel and aluminum. The hydrogenated copolymers may be viewed as S-EB-S polymers, where the S refers to the monovinyl aromatic, generally styrene, endblocks and the EB represents ethylene/butylene, which is the structure resulting from the hydrogenation of polymerized 1,3-butadiene.

Other ingredients may be present including pigments, fragrances, stabilizers, flame retardants, surfactants, waxes, flow promoters, solvents, and materials added to enhance presentability and pellet handling of the composition. The compositions can also contain 5 to 40 weight percent based on the weight of hydrocarbon component of a filler such as a hard inorganic mineral filler.

It has been found that the acidity of the system also affects the extraction efficiency. As the contacting mixture becomes less acidic, the metal residues tend to migrate to the organic phase. Since it is desirable to remove as much of the metal as possible to the aqueous phase, the pH of the aqueous phase should be maintained at no more than 4.

Air or oxygen may also be added to the system to aid the extraction. The order of addition of the air and acid is inconsequential as to the effectiveness of this invention.

EXAMPLE

Extraction tests were run on a polybutadiene polymer cement after completion of hydrogenation with a nickel-based catalyst. The polymer solution consisted of a styrene-butadiene-styrene block copolymer with a number-average molecular weight of 190,000 g/mole, of which about 30% by weight was styrene, dissolved in cyclohexane at a concentration of 13% w. The polymer cement was hydrogenated with catalyst prepared from nickel octoate and triethyl aluminum. Nickel and aluminum levels in cement were determined by atomic adsorption (AA) spectroscopy. The metal extractions were performed in a baffled 5-liter extraction vessel with a height to diameter ratio of 2.2:1. Mixing was provided via a shaft filled with two 2.5-inch diameter flat-blade turbine mixers rotating at the indicated tip speed. The extraction additives and extraction times were as follows and are summarized in the Table:

Run 1: The extractor was charged with 2700 mls of polymer cement and the contents were heated to 82° C. 900 g of preheated 1% w phosphoric acid was charged through the bottom of the reactor. The mixer speed was adjusted to 1400 ft/min. Immediately thereafter a mixture of 3% oxygen in nitrogen was bubbled through the reactor contents at 250 ml/min for 5 minutes. Samples of the mixture were pulled at various time intervals and centrifuged at about $10^6$ g-minutes to completely separate the phases. The polymer cement phase was analyzed by AA for residual nickel and extraction was terminated when the residual nickel value reached 1.5 ppm or below. Results are shown in the Table.

Run 2: The extractor was charged with 2700 mls of polymer cement and the contents were heated to 82° C. 10.47 g of di-2-ethylhexyl phosphoric acid (D2EHPA) was added and pre-mixed into the cement for 5 minutes. The mixture was shut off, and 900 g of preheated 1% w phosphoric acid was charged through the bottom of the reactor. The mixer speed was adjusted to 1400 ft/min. Immediately thereafter a mixture of 3% oxygen in nitrogen was bubbled through the reactor contents at 250 ml/min for 5 minutes. Samples of the mixture were pulled at various time intervals and centrifuged at about $10^6$ g-minutes to completely separate the phases. The polymer cement phase was analyzed by AA for residual nickel and extraction was terminated when the residual nickel value reached 1.5 ppm or below. Results are shown in the Table.

Run 3: Run 2 was repeated with 5.22 g D2EHPA.

Run 4: Run 2 was repeated with 2.61 g D2EHPA.

Run 5: Run 2 was repeated with 1.32 g D2EHPA.

Run 6: Run 1 was repeated with the mixer speed reduced to 700 ft/min.

Run 7: Run 2 was repeated with the mixer speed reduced to 700 ft/min.

Run 8: Run 2 was repeated with the mixer speed reduced to 260 ft/min.

Run 9: Run 2 was repeated using 1130 ppm 2-ethylhexyl acid phosphate (2-EHAP, 1:1 molar mixture of mono- and di-2-ethylhexyl phosphoric acid) in place of D2EHPA.

Run 10: Run 1 was repeated using 1% w sulfuric acid in place of phosphoric acid. The polymer cement was analyzed by AA for residual aluminum. Results are shown in the Table.

Run 11: Run 10 was repeated with the addition of 4970 ppm D2EHPA to the cement prior to extraction.

Run 12: Run 10 was repeated with 0.1% w sulfuric acid. Residual aluminum levels were not determined.

Run 13: Run 12 was repeated with the addition of 4970 ppm D2EHPA to the cement prior to extraction. Residual aluminum levels were not determined.

Run 14: Run 1 was repeated with the amount of sulfuric acid charged to the extractor reduced to achieve an aqueous to organic ratio of 0.1 vol/vol.

Run 15: Run 11 was repeated using 2500 ppm butyl acid phosphate (BAP, 1:1 mixture mono- and di-butyl phosphoric acid) in place of D2EHPA.

Run 16: Run 11 was repeated using 2500 ppm IONQUEST® 801 (phosphonic acid, (2-ethylhexyl), mono (2-ethylhexyl) ester, by Albright & Wilson Americas, Inc.) in place of D2EHPA.

Run 17: Run 11 was repeated using 2500 ppm dodecylbenzene sulfonic acid (DDBSA) in place of D2EHPA.

Run 18: Run 11 was repeated using 2500 ppm DEQUEST® 2000 (nitrilotris(methylene)triphosphonic acid, by Monsanto Chemical Company), available as a 50% w aqueous solution, in place of D2EHPA.

Run 19: For comparison, Run 2 was repeated using 1215 ppm 2-ethylhexanoic acid (2-EHA, pKa=4.76) in place of D2EHPA.

Run 20: For comparison, Run 2 was repeated using deionized water in place of phosphoric acid.

TABLE

Experimental Conditions and Analytical Results

| Run | Additive | Additive Conc. (ppm) | Aqueous Phase (% w) | Phase Ratio (aq/org)[a] | Mixer Speed (ft/min) | Mix Time | | | | | | |
|---|---|---|---|---|---|---|---|---|---|---|---|---|
| | | | | | | t = 0 | t = 2.5 | t = 5 | t = 10 | t = 15 | t = 20 | t = 25 |
| | | | | | | Nickel (ppm cement basis) at mix time (min) | | | | | | |
| 1 | none | 0 | 1.0 $H_3PO_4$ | 0.35 | 1400 | 39.8 | 5.0 | 2.4 | 1.3 | — | — | — |
| 2 | D2EHPA | 4930 | 1.0 $H_3PO_4$ | 0.35 | 1400 | 45.2 | 0.8 | — | — | — | — | — |
| 3 | D2EHPA | 2460 | 1.0 $H_3PO_4$ | 0.35 | 1400 | 45.1 | 0.8 | — | — | — | — | — |
| 4 | D2EHPA | 1230 | 1.0 $H_3PO_4$ | 0.35 | 1400 | 44.6 | 1.5 | — | — | — | — | — |
| 5 | D2EHPA | 620 | 1.0 $H_3PO_4$ | 0.35 | 1400 | 43.9 | 2.4 | 1.4 | — | — | — | — |
| 6 | none | 0 | 1.0 $H_3PO_4$ | 0.35 | 700 | 44.0 | 12.8 | 6.7 | 3.7 | 2.1 | 1.9 | 1.8 |
| 7 | D2EHPA | 4930 | 1.0 $H_3PO_4$ | 0.35 | 700 | 44.2 | 0.5 | — | — | — | — | — |
| 8 | D2EHPA | 4930 | 1.0 $H_3PO_4$ | 0.35 | 260 | 44.4 | 3.1 | 0.5 | — | — | — | — |
| 9 | 2-EHAP | 1130 | 1.0 $H_3PO_4$ | 0.35 | 1400 | 44.5 | 0.2 | — | — | — | — | — |
| 10 | none | 0 | 1.0 $H_2SO_4$ | 0.35 | 1400 | 42.2 | 18.2 | 13.0 | 5.9 | 3.1 | 1.4 | — |
| 11 | D2EHPA | 4970 | 1.0 $H_2SO_4$ | 0.35 | 1400 | 45.4 | 3.5 | 0.7 | — | — | — | — |
| 12 | none | 0 | 0.1 $H_2SO_4$ | 0.35 | 1400 | 44.7 | 21.8 | 21.6 | 17.5 | 15.8 | 13.7 | 11.2 |
| 13 | D2EHPA | 4970 | 0.1 $H_2SO_4$ | 0.35 | 1400 | 48.6 | 4.3 | 2.2 | 0.2 | — | — | — |
| 14 | D2EHPA | 4980 | 1.0 $H_2SO_4$ | 0.1 | 1400 | 44.7 | 2.9 | 0.7 | — | — | — | — |
| 15 | BAP | 2500 | 1.0 $H_2SO_4$ | 0.35 | 1400 | 44.1 | 3.0 | 0.7 | — | — | — | — |
| 16 | IONQUEST ® 801 | 2500 | 1.0 $H_2SO_4$ | 0.35 | 1400 | 43.4 | 8.2 | 5.8 | 1.9 | 0.7 | — | — |
| 17 | DDBSA | 2500 | 1.0 $H_2SO_4$ | 0.35 | 1400 | 44 | 2 | 1.4 | — | — | — | — |
| 18 | DEQUEST ® 2000 | 2500 | 1.0 $H_2SO_4$ | 0.35 | 1400 | 43.8 | 6 | 2.3 | 0.2 | — | — | — |
| 19 | 2-EHA | 1215 | 1.0 $H_3PO_4$ | 0.35 | 1400 | 43.9 | 7.3 | 3.4 | 2 | 0.9 | — | — |
| 20 | D2EHPA | 4970 | D.I. water | 0.35 | 1400 | 43.6 | 38.0 | 37.4 | 36.1 | 36.0 | 35.6 | 35.6 |
| | | | | | | Aluminum[b] (ppm cement basis) at mix time (min) | | | | | | |
| 10 | none | 0 | 1.0 $H_2SO_4$ | 0.35 | 1400 | 44 | 4 | <2 | — | — | — | — |
| 11 | D2EHPA | 4970 | 1.0 $H_2SO_4$ | 0.35 | 1400 | 45 | <2 | — | — | — | — | — |

[a] aqueous/organic
[b] The experimental limit of detection for aluminum was <2 ppm It can be seen that extraction time is accelerated with as little as 600 ppm D2EHPA (Examples 1–5). The acceleration is significant in that it shortens the extraction time required to prepare essentially metal-free polymer products, effectively reducing the size of processing equipment required.

It can also be seen that the presence of D2EHPA reduces the sensitivity of the cement to the extraction mixer speed (Examples 6–8).

Any mineral acid may be used as extractant. Both phosphoric acid (Examples 1–9) and sulfuric acid (Examples 10–18) were used with success. However, extracting with water (Example 20) was unsuccessful. Further, acid strengths which are quite low (Examples 12 and 13) are effective in the presence of an additive. Also, a comparison of Examples 11 and 13 indicates the catalyzed extraction is effective at low aqueous to organic phase ratios (vol/vol) where the organic phase is expected to be the continuous phase during the extraction.

While this invention has been described in detail for the purpose of illustration, it is not to be construed as limited thereby but is intended to cover all changes and modifications within the spirit and scope thereof.

What is claimed is:

1. A method of removing a metal residue from a polymer cement, said method comprising:
   adding a sufficient amount of an organic-soluble acid having a pKa no greater than about 4.5 to the polymer cement to form an acid containing organic phase;
   mixing the acid containing organic phase with an aqueous phase containing a mineral acid; and
   recovering the polymer cement substantially free of the metal residue.

2. The method according to claim 1, wherein the organic-soluble acid is selected from the group consisting of di-2-ethylhexyl phosphoric acid, 2-ethyl hexyl acid phosphate, butyl acid phosphate, 2-ethylhexylphosphonic acid mono (2-ethylhexyl) ester, dodecylbenzenesulfonic acid, nitrilotris (methylene) triphosphonic acid, and mixtures thereof.

3. The method according to claim 2, wherein a volume ratio of the aqueous phase to the organic phase is in the range of about 0.1 to about 3.0.

4. The method according to claim 3, wherein the metal residue in the polymer cement comprises metal polymerization initiator residue and metal hydrogenation catalyst residue.

5. The method according to claim 4, wherein the polymer cement comprises a block copolymer having at least two endblocks of polymerized monovinyl aromatic compound and a midblock of polymerized conjugated diene.

6. The method according to claim 5, wherein the polymerized conjugated diene is selected from the group consisting of polymerized butadiene and polymerized isoprene.

7. The method according to claim 6, wherein the polymerized conjugated diene is polymerized butadiene.

8. The method according to claim 7, wherein the residue of the polymerization initiator comprises lithium and the residue of the hydrogenation catalyst comprises nickel and aluminum.

9. The method according to claim 8, wherein the organic-soluble acid is effective in reducing extraction time to a predetermined nickel residue level by about 50 percent to about 75 percent compared to extraction with the mineral acid alone.

10. The method according to claim 8, wherein the organic-soluble acid is effective in reducing the concentration of the mineral acid by up to 90 percent compared to the concentration of the mineral acid for extraction with the mineral acid alone.

11. The method according to claim 9, wherein the organic-soluble acid is di-2-ethylhexyl phosphoric acid.

12. The method according to claim 11, wherein the di-2-ethylhexyl phosphoric acid is added at a concentration of at least 600 ppm.

13. The method according to claim 1, further comprising maintaining a pH of the aqueous phase at no more than 4.

14. A method of removing metal residues from a polymer cement, said method comprising:

polymerizing a monomer selected from the group consisting of conjugated alkadienes, monoalkenyl-substituted aromatic compounds, and mixtures thereof with an alakali-metal to form a polymer cement comprising alkali metal terminated polymer;

hydrogenating the polymer cement with a nickel-based hydrogenation catalyst to form a hydrogenated polymer cement having metal residues of the alkali-metal and the hydrogenation catalyst;

adding a sufficient amount of an organic-soluble acid having a pKa no greater than about 4.5 to the hydrogenated polymer cement to form an acid containing organic phase;

mixing the acid containing organic phase with an aqueous phase containing mineral acid at a volume ratio of the aqueous phase to the organic phase from about 0.1 to about 0.3; and recovering the hydrogenated polymer cement substantially free of the metal residues.

15. The method according to claim 14, wherein the organic-soluble acid is selected from the group consisting of di-2-ethylhexyl phosphoric acid, 2-ethyl hexyl acid phosphate, butyl acid phosphate, 2-ethylhexylphosphonic acid mono(2-ethylhexyl) ester, dodecylbenzenesulfonic acid, nitrilotris(methylene)triphosphonic acid, and mixtures thereof.

16. The method according to claim 15, wherein the hydrogenated polymer cement comprises a block copolymer having at least two endblocks of polymerized monovinyl aromatic compound and a midblock of polymerized conjugated diene.

17. The method according to claim 16, wherein the polymerized conjugated diene is selected from polymerized butadiene and polymerized isoprene.

18. The method according to claim 17, wherein the polymerized conjugated diene is polymerized butadiene.

19. The method according to claim 18, wherein the metal residue of the alkali metal comprises lithium and the metal residue of the hydrogenation catalyst comprises nickel and aluminum.

20. The method according to claim 19, wherein the organic-soluble acid is effective in reducing extraction time to a predetermined nickel residue level by about 50 percent to about 75 percent compared to extraction with the mineral acid alone.

21. A method according to claim 19 wherein the organic-soluble acid is effective in reducing the concentration of mineral acid by up to 90 percent compared to the concentration of mineral acid for extraction with a mineral acid alone.

22. A method according to claim 20 wherein the organic-soluble acid is di-2-ethylhexyl phosphoric acid.

23. A method according to claim 14 further comprising maintaining a pH of the aqueous phase at no more than 4.

* * * * *